United States Patent
Shaffer et al.

(10) Patent No.: US 6,934,380 B2
(45) Date of Patent: Aug. 23, 2005

(54) METHOD AND SYSTEM FOR AUTOMATIC CONTACT DISTRIBUTION UTILIZING PRESENCE DETECTION

(75) Inventors: Shmuel Shaffer, Palo Alto, CA (US); Joseph F. Khouri, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 283 days.

(21) Appl. No.: 10/428,401

(22) Filed: May 2, 2003

(65) Prior Publication Data

US 2004/0218749 A1 Nov. 4, 2004

(51) Int. Cl.[7] .............................. H04M 3/00
(52) U.S. Cl. ...................... 379/265.03; 379/265.04
(58) Field of Search .................. 379/265.01–265.06

(56) References Cited

U.S. PATENT DOCUMENTS

| | | | |
|---|---|---|---|
| 4,694,483 A | * 9/1987 | Cheung | 379/265.06 |
| 5,499,291 A | * 3/1996 | Kepley | 379/265.06 |
| 5,526,416 A | 6/1996 | Dezonno et al. | 379/265 |
| 5,724,420 A | 3/1998 | Torgrim | 379/372 |
| 5,991,645 A | 11/1999 | Yuen et al. | 455/568 |
| 6,266,666 B1 | * 7/2001 | Ireland et al. | 707/10 |
| 6,295,354 B1 | 9/2001 | Dezonno | 379/266 |
| 6,330,325 B1 | * 12/2001 | Reid et al. | 379/265.01 |
| 6,546,097 B1 | 4/2003 | Peltz | 379/265.07 |
| 2003/0154240 A1 | * 8/2003 | Nygren et al. | 709/203 |
| 2003/0161297 A1 | * 8/2003 | Noda et al. | 370/352 |

* cited by examiner

Primary Examiner—Creighton Smith
(74) Attorney, Agent, or Firm—Baker Botts L.L.P.

(57) ABSTRACT

A method for automatic contact distribution includes receiving a contact for connection with an agent and distributing the contact to a first agent. The method includes automatically transferring the first agent from a ready state to a second state if the first agent does not answer the contact and detecting the presence of the first agent at a device associated with the first agent when the first agent is in the second state. The method may include transferring the first agent from the second state to the ready state after detecting the presence of the first agent at a device associated with the first agent. The second state may comprises a system initiated not ready (SINR) state.

36 Claims, 2 Drawing Sheets

METHOD AND SYSTEM FOR AUTOMATIC CONTACT DISTRIBUTION UTILIZING PRESENCE DETECTION

TECHNICAL FIELD OF THE INVENTION

This invention relates in general to automated network communication distribution and, more particularly, to a method and system for automatic contact distribution utilizing presence detection.

BACKGROUND OF THE INVENTION

Automatic contact distributors are specialized systems designed to match incoming requests for service, for example a telephone call or an e-mail, with a resource that is able to provide that service, for example a human contact center agent. Automatic contact distributors generally perform one or more of the following functions: (i) recognize and answer incoming contacts; (ii) review database(s) for instructions on what to do with a particular contact; (iii) using these instructions, identify an appropriate agent and queue the contact, often times providing a prerecorded message; and (iv) connect the contact to an agent as soon as the agent is available.

Agents associated with automatic contact distributors indicate their availability for handling contacts by going into a "ready" state. Similarly, agents indicate that they are not available by going into a "not ready" (NR) state. Agents may transition between the ready and NR states by pressing an appropriate button on their Agent Desktop or by pressing a pre-programmed button on their internet protocol (IP) or other phone.

In the event that an agent steps away from his desk and forgets to logoff or transfer to the NR state, the automatic contact distributor may present a contact to the agent. To prevent contacts from being stuck with an agent who is unavailable, the automatic contact distributor is programmed to automatically transition the agent to the NR state, withdraw the contact from the agent and transfer it to the next available agent. In such a situation, the agent may not be aware that his state in the system has transitioned to the NR state.

SUMMARY OF THE INVENTION

The present invention provides a method and system for automatic contact distribution utilizing presence detection that substantially eliminates or reduces at least some of the disadvantages and problems associated with previous methods and systems for automatic contact distribution.

In accordance with a particular embodiment of the present invention, a method for automatic contact distribution includes receiving a contact for connection with an agent and distributing the contact to a first agent. The method includes automatically transferring the first agent from a ready state to a second state if the first agent does not answer the contact and detecting the presence of the first agent at a device associated with the first agent when the first agent is in the second state.

The method may include transferring the first agent from the second state to the ready state after detecting the presence of the first agent at a device associated with the first agent. The method may also include receiving an additional contact for connection with an agent and distributing the additional contact to the first agent after transferring the first agent from the second state to the ready state. Detecting the presence of the first agent at a device associated with the first agent may comprise detecting the presence of the first agent at a personal computer (PC) of the first agent or at a phone of the first agent. The second state may comprise a system initiated not ready (SINR) state.

In accordance with another embodiment, an automatic contact distribution system includes at least one input port operable to receive a contact for connection with an agent and a distributor operable to distribute the contact to a first agent. The system includes a presence server operable to automatically transfer the first agent from a ready state to a second state if the first agent does not answer the contact and detect the presence of the first agent at a device associated with the first agent when the first agent is in the second state. The presence server may be further operable to transfer the first agent from the second state to the ready state after detecting the presence of the first agent at a device associated with the first agent. The device associated with the first agent may comprise a PC of the first agent or a phone of the first agent.

Technical advantages of particular embodiments of the present invention include a system initiated not ready state to which an agent may be automatically transferred when the agent is away from his desk but has not manually transferred from a ready state to a not ready state. This SINR state therefore enables the automatic contact distribution system to distinguish between agents who have transferred out of the ready state as a result of their own action and agents who have been transferred out of the ready state automatically by the system. Presence detection may then be used to transfer the agent back to the ready state, because the agent may otherwise be unaware that he has been transferred out of the ready state. Accordingly, efficiency of the system is increased and costs are saved since the agent can be transferred to the ready state to receive contacts when the agent would otherwise have remained in a not ready state.

Other technical advantages of particular embodiments of the present invention include use of a message to notify an agent after his presence has been detected that he has been automatically transferred out of a ready state and querying the agent regarding to which state the agent desires to be transferred (i.e. ready or not ready). Use of such a message provides additional control to an agent who may be unable to answer contacts despite being present at his desk.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
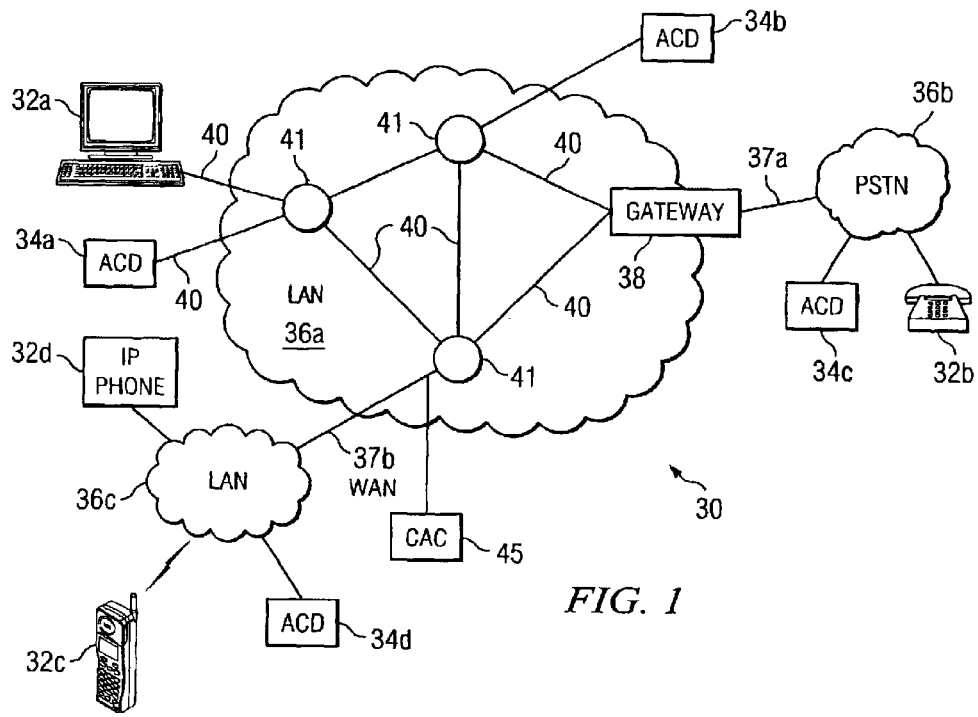
FIG. 1 illustrates a communication system including a plurality of endpoints operable to communicate among each other and a plurality of automatic contact distributors, in accordance with a particular embodiment of the present invention.

FIG. 1 illustrates a communication system 30 including a plurality of endpoints 32a–32d having the ability to establish communication sessions between each other and/or automatic contact distributors 34a–34d, using one or more of communication networks 36a–36c. Automatic contact distributors are specialized communication systems designed to route incoming contacts to available agents, so that contacts are properly and/or evenly distributed. For the purposes of this specification, "automatic contact distributor" shall refer to any combination of hardware, software and/or embedded logic which is operable to automatically distribute incoming contacts, and "contacts" shall include requests for service transmitted using any audio and/or video means, including signals, data or messages transmitted through voice devices, text chat, web sessions, facsimile, instant messaging and e-mail.

In the illustrated embodiment, incoming contacts are routed to an automatic contact distributor of a communication system. The contacts are distributed to agents able to service the automatic contact distributor. However, at times an agent may have left his desk or may be otherwise unable to answer a distributed contact despite never having manually left a ready state of the system. The teachings of the present invention provide a system and method for automatic contact distribution utilizing presence detection to automatically transfer such an agent to a different state and subsequently detect the agent's presence at a device when the agent returns so that the agent may resume receiving and answering contacts that may be suitable for the agent.

In the illustrated embodiment, communication network 36a is a local area network (LAN) that enables communication between a plurality of endpoints 32a–32d and automatic contact distributors 34a—34d distributed across multiple cities and geographic regions. In another embodiment, a single, central automatic contact distributor may be used, which distributes incoming contacts to agents distributed across multiple cities and geographic regions. Communication network 36b is a public switched telephone network (PSTN) and couples endpoint 32b and automatic contact distributor 34c with communication network 36a through gateway 38. Communication network 36c is another LAN, which couples endpoints 32c and 32d and automatic contact distributor 34d with communication network 36a. Accordingly, users of endpoints 32a–32d and automatic contact distributors 34a–34d can establish communication sessions between and among each network component coupled for communication with one or more of networks 36a–36c. Communication links 37a and 37b couple communication networks 36a and 36b, and communication networks 36a and 36c, respectively. In the illustrated embodiment, communication link 37b is a wide area network (WAN), which couples LANs 36a and 36c. A contact admission control (CAC) system 45 may be used to monitor the amount of bandwidth available over WAN 37b.

Communication network 36a includes a plurality of segments 40 and nodes 41 that couple endpoint 32a with automatic contact distributors 34a and 34b, gateway 38, and communication networks 36b–36c. Therefore, a user of endpoint 32a is provided with access to endpoints 32b–32d, and automatic contact distributors 34a–34d. Nodes 41 may include any combination of network components, gatekeepers, contact managers, routers, hubs, switches, gateways, endpoints, or other hardware, software, or embedded logic implementing any number of communication protocols that allow for the exchange of packets in communication system 30.

Although the illustrated embodiment includes three communication networks 36a–36c, the term "communication network" should be interpreted as generally defining any network capable of transmitting audio and/or video telecommunication signals, data, and/or messages, including signals, data or messages transmitted through text chat, instant messaging and e-mail. Any one of networks 36a–36c may be implemented as a local area network (LAN), wide area network (WAN), global distributed network such as the Internet, Intranet, Extranet, or any other form of wireless or wireline communication network. Generally, network 36a provides for the communication of packets, cells, frames, or other portions of information (generally referred to as packets herein) between endpoints 32a–32d. Communication network 36a may include any number and combination of segments 40, nodes 41, endpoints 32a–32d, and/or automatic contact distributors 34a–34d.

In a particular embodiment, communication network 36a employs voice communication protocols that allow for the addressing or identification of endpoints, nodes, and/or automatic contact distributors coupled to communication network 36a. For example, using Internet protocol (IP), each of the components coupled together by communication network 36a in communication system 30 may be identified in information directed using IP addresses. In this manner, network 36a may support any form and/or combination of point-to-point, multicast, unicast, or other techniques for exchanging media packets among components in communication system 30. Any network components capable of exchanging audio, video, or other data using frames or packets, are included within the scope of the present invention.

Network 36a may be directly coupled to other IP networks including, but not limited to, another LAN, or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks through the use of interfaces or components, for example gateway 38. In the illustrated embodiment, communication network 36a is coupled with PSTN 36b through gateway 38. PSTN 36b includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 36b), a dedicated circuit is not required for the duration of a contact or fax transmission over IP networks.

Technology that allows telecommunications to be transmitted over an IP network may comprise Voice over IP (VOIP), or simply Voice over Packet (VoP). In the illustrated embodiment, endpoint 32d, automatic contact distributors 34a–34b, and gateway 38 are IP telephony devices. IP telephony devices have the ability of encapsulating a user's voice (or other input) into IP packets so that the voice can be transmitted over network 36a. IP telephony devices may include telephones, fax machines, computers running telephony software, nodes, gateways, or any other device capable of performing telephony functions over an IP network.

It will be recognized by those of ordinary skill in the art that endpoints 32a–32d, automatic contact distributors 34a–34d, and/or gateway 38 may be any combination of hardware, software, and/or encoded logic that provides communication services to a user. For example, endpoints 32a–32d may include a telephone, a computer running telephony software, a video monitor, a camera, an IP phone, a cell phone or any other communication hardware, software, and/or encoded logic that supports the communication of packets of media (or frames) using communication network 36a. Endpoints 32a–32d may also include unattended or automated systems, gateways, other intermediate components, or other devices that can establish media sessions. Although FIG. 1 illustrates a particular number and configuration of endpoints, automatic contact distributors, segments, nodes, and gateways, communication system 30 contemplates any number or arrangement of such components for communicating media.

Figure 2:
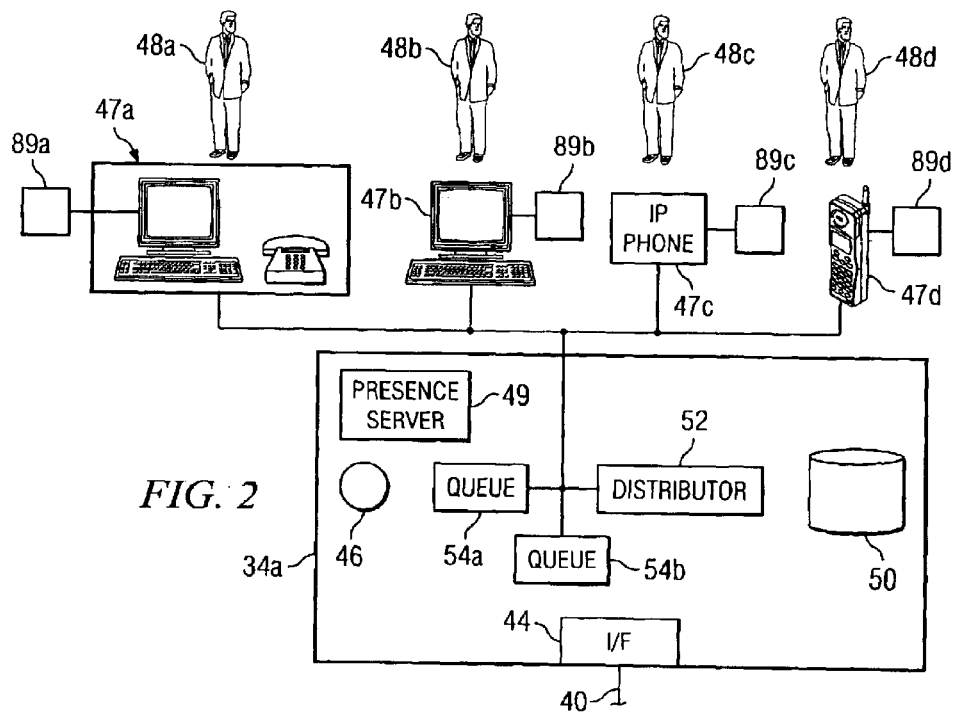
FIG. 2 illustrates an automatic contact distributor of FIG. 1 in more detail, illustrating aspects of the present invention.

FIG. 2 illustrates automatic contact distributor 34a in more detail, in accordance with a particular embodiment of the present invention. Automatic contact distributor 34a includes an interface or input ports 44 which couple automatic contact distributor 34a with communication network 36a, using segment 40. When a contact is received at automatic contact distributor 34a, a processor 46 and presence server 49 are used to determine which of a plurality of agents 48a–48d should receive the contact using endpoints 47a–47d, respectively. In doing so, processor 46 may use presence server 49, a memory lookup, a database, or other memory module, such as memory module 50. Processor 46 may be a microprocessor, controller, or any other suitable computing device or resource. Memory module 50 may be any form of volatile or non-volatile memory including, without limitation, magnetic media, optical media, random access memory (RAM), read-only memory (ROM), removable media, or any other suitable local or remote memory component.

Presence server 49 may be any combination of hardware, software and/or encoded logic, and is used to monitor the presence of an agent at an endpoint. Presence server 49 may detect the presence of an agent at an endpoint in association with one or more of presence clients 89a–89d at the agent's endpoint, for example, at the agent's PC, phone or other device. The automatic contact distributor uses processor 46 to monitor conditions of automatic contact distributor 34a, such as the number, type or characteristics of contacts in queues 54 or the "state" of each agent (e.g., ready, not ready, system initiated not ready). It will be recognized by those of ordinary skill in the art that automatic contact distributor 34a may include any number of processors or memory modules to accomplish the functionality and features described herein. The processors 46, memory modules 50, and/or presence server 49 associated with automatic contact distributor 34a may be centrally located (local) with respect to one another, or distributed throughout communication network 36a.

If a suitable agent is available to receive the incoming contact, a distributor 52 of automatic contact distributor 34a distributes the contact to such agent for connection. Such connection may comprise, for example, coupling a sender of the contact with the suitable agent if the contact comprises a voice call or transmitting the contact to the suitable agent if the contact comprises, for example, an e-mail. If a suitable agent is not available, the contact may be placed into a queue 54 in order to wait for an appropriate agent(s). In this embodiment, automatic contact distributor 34a has two queues 54; however other embodiments of the present invention may have none, one or more than two queues 54. The selection of which queue 54 to place an incoming contact may depend on the type of customer making the contact, the type of service requested in the contact or any other characteristic or condition relating to the contact or automatic contact distributor 34a. While a customer is waiting for an agent, automatic contact distributor 34a may perform one or more of several functions including data collection from the user, playing of pre-recorded messages, or other automated process. As soon as a suitable agent becomes available, distributor 52 distributes the contact to the appropriate agent.

As discussed above, presence server 49 detects the presence or availability of the agent. The presence of the agent can be established and detected on the agent's personal computer (PC), personal digital assistant (PDA), phone or any other presence client device (e.g., presence clients 89a–89d). An agent typically manually transfers from a ready state to a not ready (NR) state by pressing an appropriate key or button on the agent's endpoint 47, such as a personal computer, desktop or phone. In particular situations, a contact may be distributed to an agent 48a who has stepped away from his desk and forgotten to manually log off or transfer to a NR state. Since agent 48a is away and/or unavailable to receive the contact, the contact will go unanswered by agent 48a and will be redistributed to another agent. In this case, presence server 49, in collaboration with distributor 52, will automatically transition agent 48a to a system initiated not ready (SINR) state. Thus, an agent is placed in the SINR state when the agent was not available to receive a contact but has not manually transferred to the NR state. In other words, when presence server 49, in collaboration with distributor 52, detects that the agent is not handling the contact despite the fact that he is in a ready state according to the system because the agent has not manually transferred to the NR state, presence server 49, in collaboration with distributor 52, transitions the agent's state to the SINR state. Both in the SINR and NR states, distributor 52 does not present any new contacts to the agent. The SINR state therefore enables the automatic contact distribution system to distinguish between agents who have transferred out of the ready state as a result of their own action and agents who have been transferred out of the ready state automatically by the system.

In accordance with a particular embodiment, when the presence of agent 48a who has been placed in the SINR state is established on the agent's endpoint 47a using the presence client 89a, such as the agent's PC, IP phone or other device, presence server 49 transitions the agent's state back to the ready state. Distributor 52 then begins presenting the agent with contacts. The presence of an agent may be established when the agent touches a key on a desktop or other device, such as a PC or IP or other phone, or otherwise uses a component associated with or coupled with the automatic contact distributor. Detecting the presence of an agent who may be unaware that he is not in the ready state increases efficiency and saves costs since the agent can then be transferred to a ready state to receive contacts when the agent otherwise would have remained in a NR state.

In some embodiments, when presence server 49, in association with the presence client 89, detects the presence of an agent who is in the SINR state, the presence server presents the agent with a message, such as "Your state has been transferred by the system to SINR. Please indicate if you wish to transfer to the Ready or Not Ready state." The message may be presented to the agent via a simple pop up window, audible message, instant message (IM), message ring, or any other technique. The agent may respond to the message to indicate the state (ready or NR) to which the agent desires to be transferred. Use of such a message provides additional control to an agent who may be unable to answer contacts despite being present at his desk.

In accordance with particular embodiments, upon detecting the presence of an agent who has been placed in the SINR state, presence server 49 executes a script that determines the state to which the agent should be transferred. The script may be customized to fit particular needs. For example, a script may inform the automatic contact distributor that if an agent currently in the SINR state begins using a word processing program then the agent should be transferred to the ready state to receive contacts; however, the script may also inform the automatic contact distributor that if the agent begins using e-mail while in the SINR state then the agent should not be transferred to the ready state and instead should be transferred to the NR state. In another example, a script may indicate that if the agent's presence is detected on the agent's PC, the agent should be transitioned to the ready state; but if the agent's presence is detected on the agent's cell phone, the agent should be transferred to the NR state. Moreover, in some embodiments a system manager may configure automatic contact distributor 34*a* to allow or prohibit the automated transition from the SINR to the ready state upon detection of the agent's presence.

Figure 3A:
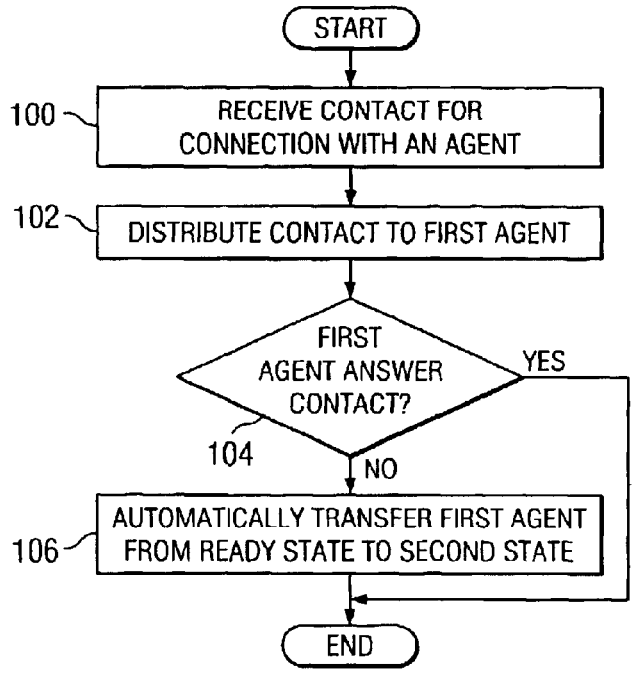
FIG. 3A illustrates a method for automatic contact distribution, in accordance with an embodiment of the present invention.

FIG. 3A illustrates a method for automatic contact distribution, in accordance with a particular embodiment of the present invention. The method begins at step 100 where a contact is received for connection with an agent. The contact may be received at an automatic contact distributor. At step 102, the contact is distributed to a first agent. The contact may be distributed to the first agent by a distributor of an automatic contact distributor.

At step 104, it is determined whether or not the first agent answers the contact. If the first agent answers the contact, then the method may end. If the first agent does not answer the contact, then at step 106 the first agent is automatically transferred from a ready state, in which the first agent receives contacts distributed to the agent, to a second state. The second state may comprise a SINR state. The first agent may not answer the contact, for example, if the first agent has stepped away from his desk. The first agent may still be in the ready state upon stepping away from his desk if the first agent failed to manually transfer to a NR state.

Figure 3B:
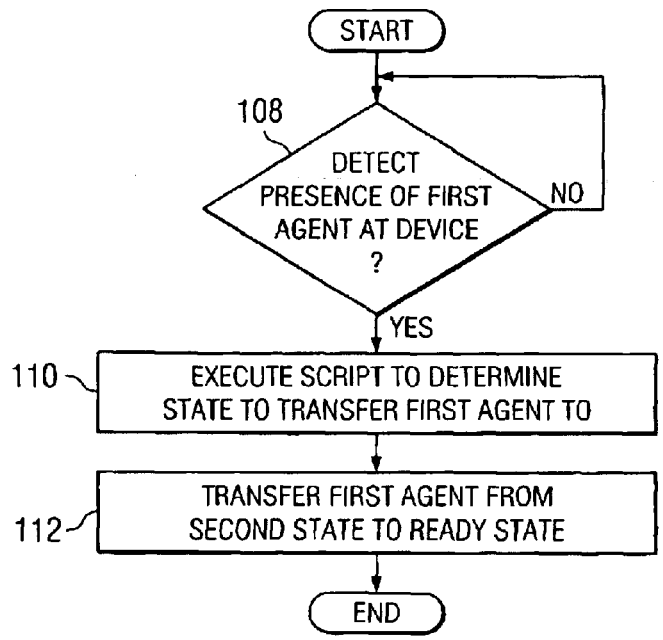
FIG. 3B illustrates a method for automatic contact distribution utilizing presence information, in accordance with an embodiment of the present invention.

FIG. 3B illustrates a method for automatic contact distribution utilizing presence information, in accordance with a particular embodiment of the present invention. This method may be executed for agents who were transmitted from the ready state to the second state. The method begins at step 108, where it is determined whether the presence of a first agent is detected at a device associated with the first agent. For example, the device may be a PC of the first agent or a phone of the first agent. The presence of the first agent may be detected when the first agent presses a button or key on the device. If the presence of the first agent is detected at the device, then at step 110 a script is executed to determine a state to which the first agent should be transferred after the presence of the first agent is detected. Such a state may depend on a particular device the first agent is using at the time and may comprise a ready state or a NR state. Particular embodiments may not include such execution of a script. Some embodiments may include the transmission of a message (via pop up window, e-mail, IM, ring or otherwise) after the presence of the first agent at the device has been detected notifying the first agent that the first agent has been transferred to the second state. The message may also ask the first agent to which state (i.e., ready or NR) to which the first agent desires to be transferred. At step 112, the first agent is transferred from the second state to a ready state for receipt of contacts distributed to the first agent. The first agent is then ready to receive subsequent contacts.

Some of the steps illustrated in FIGS. 3A and 3B may be combined, modified or deleted where appropriate, and additional steps may also be added to the flowchart. Additionally, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30 and automatic contact distributor 34*a*, these elements may be combined, rearranged or positioned in order to accommodate particular routing architectures or needs. In addition, any of these elements may be provided as separate external components to communication system 30, automatic contact distributor 34*a* or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A method for automatic contact distribution, comprising:

receiving a contact for connection with an agent;

distributing the contact to a first agent;

automatically transferring the first agent from a ready state to a second state if the first agent does not answer the contact; and detecting the presence of the first agent at a device associated with the first agent when the first agent is in the second state.

2. The method of claim 1, further comprising transferring the first agent from the second state to the ready state after detecting the presence of the first agent at a device associated with the first agent.

3. The method of claim 2, further comprising:

receiving an additional contact for connection with an agent; and distributing the additional contact to the first agent after transferring the first agent from the second state to the ready state.

4. The method of claim 1, further comprising:

executing a script to determine a third state to transfer the first agent to after detecting the presence of the first agent at a device associated with the first agent; and transferring the first agent from the second state to the third state.

5. The method of claim 4, further comprising:
receiving an additional contact for connection with an agent; and
distributing the additional contact to the first agent after transferring the first agent from the second state to the third state, the third state comprising the ready state.

6. The method of claim 4, wherein the third state comprises a not ready state.

7. The method of claim 1, wherein detecting the presence of the first agent at a device associated with the first agent comprises detecting the presence of the first agent at a personal computer (PC) of the first agent or at a phone of the first agent.

8. The method of claim 1, further comprising transmitting a message to the first agent after detecting the presence of the first agent at a device associated with the first agent, the message comprising a notification that the first agent has been transferred to the second state.

9. The method of claim 8, wherein the message further comprises a query asking the first agent to which state the first agent desires to be transferred.

10. The method of claim 1, further comprising distributing the contact to a second agent if the first agent does not answer the contact.

11. The method of claim 1, wherein the second state comprises a system initiated not ready (SINR) state.

12. An automatic contact distribution system, comprising:
at least one input port operable to receive a contact for connection with an agent;
a distributor operable to distribute the contact to a first agent;
a presence server operable to:
automatically transfer the first agent from a ready state to a second state if the first agent does not answer the contact; and
detect the presence of the first agent at a device associated with the first agent when the first agent is in the second state.

13. The system of claim 12, wherein the presence server is further operable to transfer the first agent from the second state to the ready state after detecting the presence of the first agent at a device associated with the first agent.

14. The system of claim 13, wherein:
the at least one input port is further operable to receive an additional contact for connection with an agent; and
the distributor is further operable to distribute the additional contact to the first agent after the first agent is transferred from the second state to the ready state.

15. The system of claim 12, further comprising a processor operable to execute a script to determine a third state to transfer the first agent to after the presence of the first agent at a device associated with the first agent is detected, wherein the presence server is further operable to transfer the first agent from the second state to the third state.

16. The system of claim 15, wherein:
the at least one input port is further operable to receive an additional contact for connection with an agent; and
the distributor is further operable to distribute the additional contact to the first agent after the first agent is transferred from the second state to the third state, the third state comprising the ready state.

17. The system of claim 12, wherein the device associated with the first agent comprises a personal computer (PC) of the first agent or a phone of the first agent.

18. The system of claim 12, wherein the presence server is further operable to transmit a message to the first agent after presence of the first agent at a device associated with the first agent is detected, the message comprising a notification that the first agent has been transferred to the second state.

19. The system of claim 18, wherein the message further comprises a query asking the first agent to which state the first agent desires to be transferred.

20. The system of claim 12, wherein the second state comprises a system initiated not ready (SINR) state.

21. An automatic contact distribution system, comprising:
means for receiving a contact for connection with an agent;
means for distributing the contact to a first agent;
means for automatically transferring the first agent from a ready state to a second state if the first agent does not answer the contact; and
means for detecting the presence of the first agent at a device associated with the first agent when the first agent is in the second state.

22. The system of claim 21, further comprising means for transferring the first agent from the second state to the ready state after the presence of the first agent at a device associated with the first agent is detected.

23. The system of claim 22, further comprising:
means for receiving an additional contact for connection with an agent; and
means for distributing the additional contact to the first agent after the first agent is transferred from the second state to the ready state.

24. The system of claim 21, further comprising:
means for executing a script to determine a third state to transfer the first agent to after the presence of the first agent at a device associated with the first agent is detected; and
means for transferring the first agent from the second state to the third state.

25. The system of claim 24, further comprising:
means for receiving an additional contact for connection with an agent; and
means for distributing the additional contact to the first agent after the first agent is transferred from the second state to the third state, the third state comprising the ready state.

26. The system of claim 21, further comprising means for transmitting a message to the first agent after the presence of the first agent at a device associated with the first agent is detected, the message comprising a notification that the first agent has been transferred to the second state.

27. The system of claim 26, wherein the message further comprises a query asking the first agent to which state the first agent desires to be transferred.

28. The system of claim 21, wherein the second state comprises a system initiated not ready (SINR) state.

29. Software embodied in a computer readable medium, the computer readable medium comprising code operable to:
receive a contact for connection with an agent;
distribute the contact to a first agent;
automatically transfer the first agent from a ready state to a second state if the first agent does not answer the contact; and
detect the presence of the first agent at a device associated with the first agent when the first agent is in the second state.

30. The medium of claim 29, wherein the code is further operable to transfer the first agent from the second state to the ready state after the presence of the first agent at a device associated with the first agent is detected.

31. The medium of claim 30, wherein the code is further operable to:
receive an additional contact for connection with an agent; and
distribute the additional contact to the first agent after the first agent is transferred from the second state to the ready state.

32. The medium of claim 29, wherein the code is further operable to:
execute a script to determine a third state to transfer the first agent to after the presence of the first agent at a device associated with the first agent is detected; and
transfer the first agent from the second state to the third state.

33. The medium of claim 32, wherein the code is further operable to:
receive an additional contact for connection with an agent; and
distribute the additional contact to the first agent after the first agent is transferred from the second state to the third state, the third state comprising the ready state.

34. The medium of claim 29, wherein the code is further operable to transmit a message to the first agent after the presence of the first agent at a device associated with the first agent is detected, the message comprising a notification that the first agent has been transferred to the second state.

35. The medium of claim 34, wherein the message further comprises a query asking the first agent to which state the first agent desires to be transferred.

36. The medium of claim 29, wherein the second state comprises a system initiated not ready (SINR) state.

* * * * *